Patented Nov. 30, 1943

2,335,813

UNITED STATES PATENT OFFICE 2,335,813

PRODUCTION OF CARBOXYLIC ACID ESTERS OF MONOCHLORHYDRINS

Gerhard Stein, Mannheim, Germany, assignor, by mesne assignments, to General Aniline & Film Corporation, New York, N. Y., a corporation of Delaware No Drawing. Application May 20, 1939, Serial No. 274,712. In Germany May 25, 1938

3 Claims. (Cl. 260—488)

The present invention relates to a new process of producing carboxylic acid esters of monochlorhydrin.

I have found that carboxylic acid esters of monochlorhydrin are obtained in a very simple manner by causing carboxylic acids to react with epichlorhydrin in the presence of basic organic nitrogen compounds. It is surprising that in this way esters are formed very rapidly; it is noteworthy that merely one of the hydroxyl groups formed by the splitting up of the oxygen ring is esterified, while by heating epichlorhydrin with organic carboxylic acids in the absence of a catalyst mixtures of mono and di-esters of monochlorhydrin are always obtained.

For the preparation of the esters there may be used both aliphatic carboxylic acids, as for example acetic acid, butyric acid, stearic acid, and their homologues having straight or branched chains, also hydroxyacids, such as lactic acid, halogenated and aminated carboxylic acids, such as chloroacetic acid and glycocoll, furthermore polybasic including dicarboxylic acids, such as succinic acid, adipic acid, maleic acid and citric acid and also alicyclic acids, such as hexahydrobenzoic acid, naphthenic acid, hexahydrophthalic acid or abietic acid, and also aromatic acids, as for example benzoic acid, phthalic acid and pyromellithic acid. Mixtures of acids may also be used, in particular the carboxylic acid mixtures obtainable by the oxidation of hard paraffin wax, middle oils and light oils and other high molecular weight aliphatic hydrocarbons, or fractions or single bodies separated from the same, which may have been purified by the usual methods if desired.

Basic organic nitrogen compounds suitable as catalysts are in particular amines, such as diethylamine, triethylamine, aniline or dimethylaniline, and also basic heterocyclic nitrogen compounds, such as pyridine. These amines may also be used in the form of their salts, as for example the salts of the carboxylic acids to be esterified. It is advantageous to employ relatively small amounts of catalyst; usually a few per cent, for example from about 0.3 to about 10 per cent of the amount of the initial mixture are sufficient.

In the preparation of the esters, the procedure is preferably that about an equivalent amount of epichlorhydrin is allowed to flow or to drop into the acid or acid mixture to which the catalyst has been added. The reaction often proceeds even at ordinary temperature, but it is frequently preferable to initiate it by heating. In many cases it proceeds under strong evolution of heat so that it is frequently recommended to cool during the reaction or to work in the presence of a solvent which does not impair the reaction. When reacting polycarboxylic acids, either equimolecular amounts may be reacted together, in which case generally speaking only one carboxylic group is esterified, or the corresponding multiple amount of epichlorhydrin may be used in which case the polycarboxylic ester of monochlorhydrin is obtained. An excess of epichlorhydrin may also be used, in which case the latter acts as a solvent at the same time.

The amine may readily be removed from the reaction mixture by treatment with aqueous mineral acid or by distillation and then the crude ester may either be directly used or purified by distillation, if desired under reduced pressure.

The following examples will further illustrate how the present invention may be carried out in practice, but the invention is not restricted to these examples. The parts are by weight.

Example 1

A mixture of 120 parts of acetic acid, 185 parts of epichlorhydrin and 10 parts of pyridine is heated carefully to from about 90° to 100° C. The temperature of the reaction mixture then rises without further supply of heat to about 160° C. with boiling. The reaction is completed after a short time. The monochlorhydrin monoacetic acid ester which boils almost uniformly at 106° C. under a pressure of 6 millimetres (mercury gauge) may be distilled off in a very good yield from the final mixture.

The reaction proceeds in exactly the same way by using an equal amount of aniline or dimethylaniline as the catalyst. If desired the catalyst may be removed from the final mixture by washing out with dilute hydrochloric acid before the distillation.

Example 2

92 parts of epichlorhydrin and 5 parts of dimethylaniline are added to 239 parts of the acid having an acid value of 124 obtained by catalytic oxidation of paraffin hydrocarbons. After heating to 110° C., the temperature rises spontaneously to 145° C. When the reaction is completed the mixture has an acid value of only 22. It is washed with dilute hydrochloric acid to remove the catalyst and with dilute caustic soda solution to remove unconverted acid; a monochlorhydrin monocarboxylic ester is thus obtained in the form of a semisolid mass.

Example 3

A suspension of 116 parts of phthalic acid and 92 parts of epichlorhydrin in 175 parts of xylene, to which 5 parts of aniline have been added, is heated to boiling for about half an hour. After cooling two layers are formed of which the lower is poured into 500 parts of water. The mixture obtained is neutralized by addition of 350 parts of soda. The oil is thus almost completely dissolved. By acidifying the solution, the ester formed is precipitated as a viscous oil.

Example 4

A mixture of 284 parts of stearic acid, 92 parts of epichlorhydrin and 5 parts of dimethylaniline is heated for 2 hours at about 100° C. After cooling, the dimethylaniline is removed by washing with dilute hydrochloric acid and the unconverted stearic acid is removed by washing with caustic alkali solution. The monochlorhydrin monostearic acid ester is thus obtained; it has a melting point of from 44° to 45° C.

What I claim is:

1. The process of producing mono-carboxylic acid esters of monochlorhydrin, which comprises causing a carboxylic acid to react with epichlorhydrin in the presence of a basic organic nitrogen compound.

2. The process of producing mono-carboxylic acid esters of monochlorhydrin, which comprises causing a carboxylic acid to react with epichlorhydrin in the presence of a small amount of a basic organic nitrogen compound.

3. The process of producing mono-carboxylic acid esters of monochlorhydrin which comprises causing a carboxylic acid to react with epichlorhydrin in the presence of a basic organic nitrogen compound, the latter being employed in an amount which is from about 0.3 to about 10 per cent of the weight of the said carboxylic acid and of the epichlorhydrin taken together.

GERHARD STEIN.